Feb. 17, 1931.　　　　F. MAXWELL　　　　1,792,502
SUGAR CANE CRUSHING APPARATUS
Filed June 23, 1927　　　6 Sheets-Sheet 1
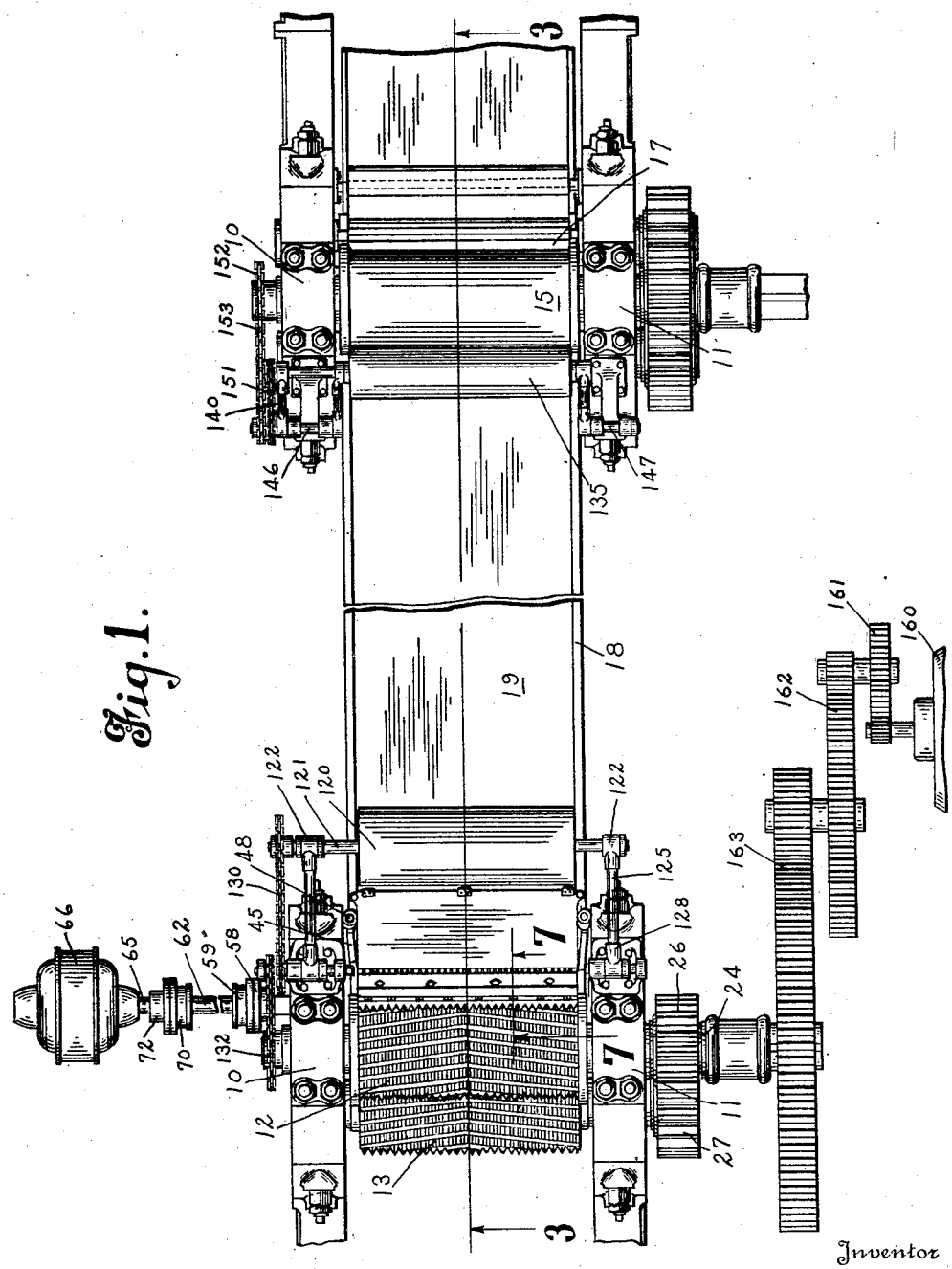
Inventor
Francis Maxwell
By Rockwell & Bartholow
Attorneys

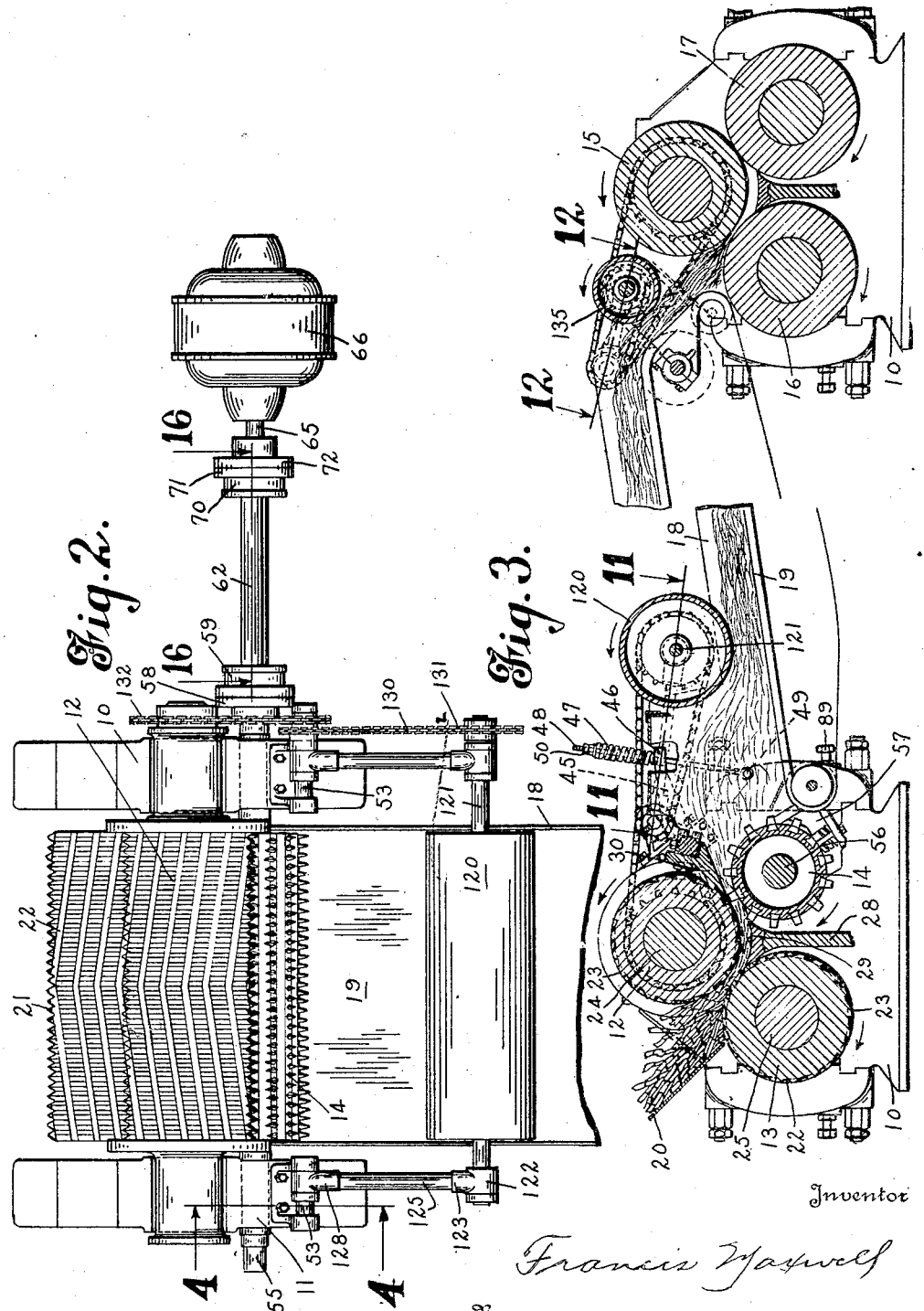

Feb. 17, 1931.  F. MAXWELL  1,792,502
SUGAR CANE CRUSHING APPARATUS
Filed June 23, 1927    6 Sheets-Sheet 3
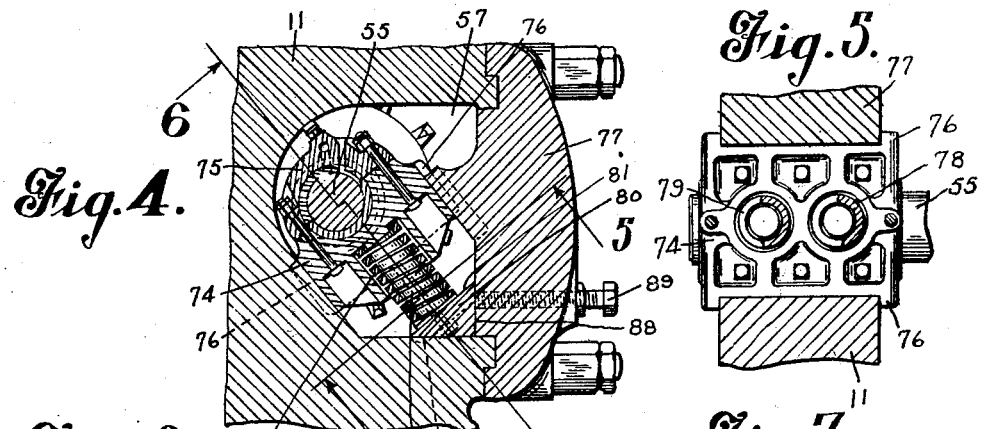
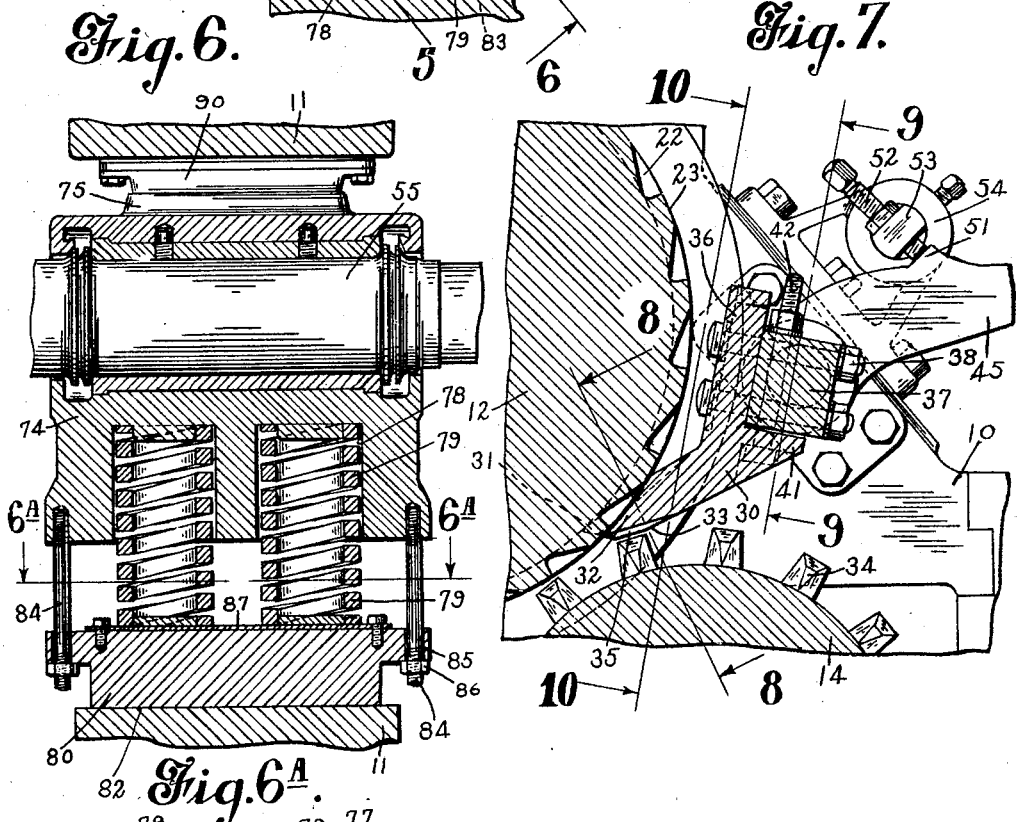
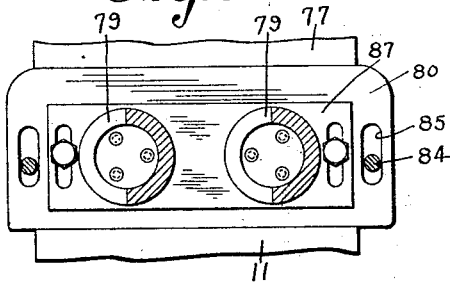

Feb. 17, 1931. F. MAXWELL 1,792,502
SUGAR CANE CRUSHING APPARATUS
Filed June 23, 1927 6 Sheets-Sheet 4

Inventor
Francis Maxwell
By Rockwell & Bartholow
Attorneys

Feb. 17, 1931.    F. MAXWELL    1,792,502
SUGAR CANE CRUSHING APPARATUS
Filed June 23, 1927    6 Sheets-Sheet 5

Inventor
Francis Maxwell
By
Rockwell & Bartholow
Attorneys

Feb. 17, 1931.　　　F. MAXWELL　　　1,792,502
SUGAR CANE CRUSHING APPARATUS
Filed June 23, 1927　　　6 Sheets-Sheet 6

Inventor
Francis Maxwell
By Rockwell & Bartholow
Attorneys

Patented Feb. 17, 1931

1,792,502

UNITED STATES PATENT OFFICE

FRANCIS MAXWELL, OF WALLINGTON, ENGLAND

SUGAR-CANE-CRUSHING APPARATUS

Application filed June 23, 1927. Serial No. 200,889.

This invention relates to sugar cane apparatus, and more particularly to that type of apparatus wherein a rapidly rotatable shredding roller acts upon the cane immediately after it has passed through a pair of cooperating crushing or pressing rolls, to thoroughly shred or disintegrate the cane, thereby more efficiently preparing it for subsequent juice expressing operations.

One of the objects of this invention is to provide a cane crushing apparatus which will efficiently prepare sugar cane or the like for subsequent juice expressing operations, and whereby the use thereof will reduce the power consumption of the combined mill to a minimum, while increasing the capacity thereof to receive cane and extract juice therefrom to a maximum.

Another object of this invention is to provide in cane crushing apparatus, an improved form of means to cooperate with the shredding roll thereof whereby the cane will be more efficiently shredded or disintegrated.

Another object of this invention is to provide in cane crushing apparatus, a novel and improved form of bearing for adjustably supporting the shredding roll thereof.

Still other objects of this invention are to provide in cane crushing apparatus, novel and improved means to compress the shredded cane after shredding the same and before delivery thereof to a subsequent juice expressing mill, novel means to drive the compressing means, and improved means for connecting the shredding roll to the source of power therefor.

To these and other ends, the invention consists in the novel features and combinations of parts to be hereinafter described and claimed.

In the accompanying drawings:

Fig. 1 is a plan view of a cane crushing apparatus, embodying the features of this invention;

Fig. 2 is an enlarged partial plan view of the same;

Figure 8:
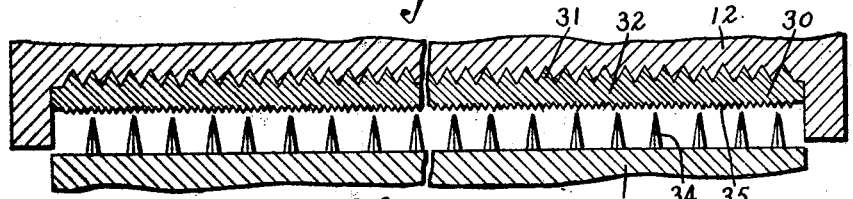
Figure 9:
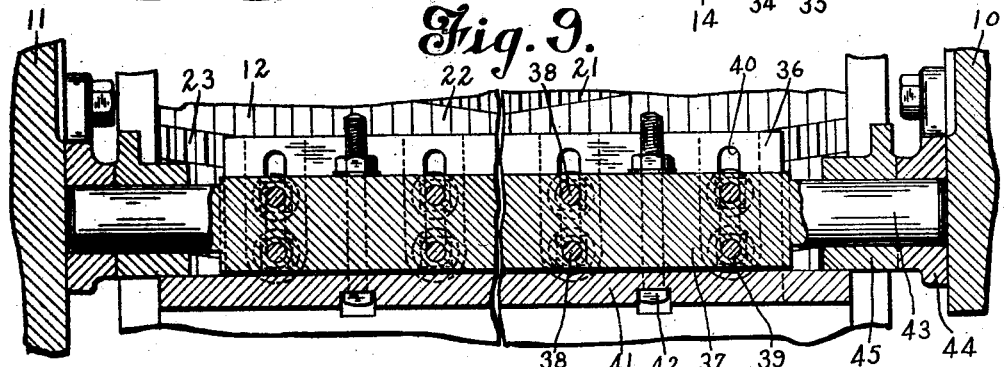
Figure 10:
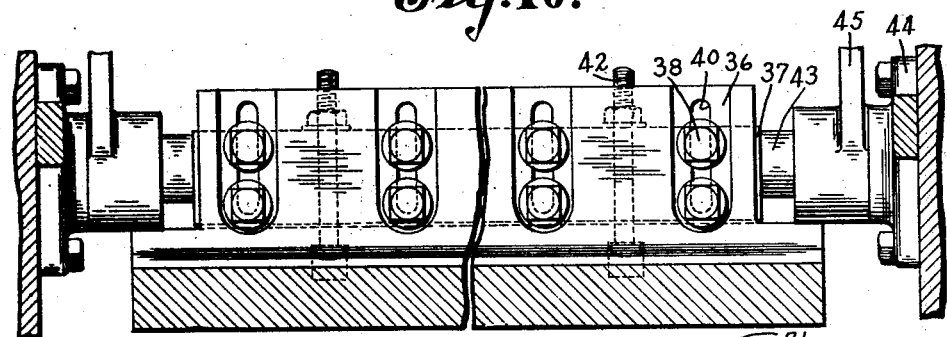
Figure 16:
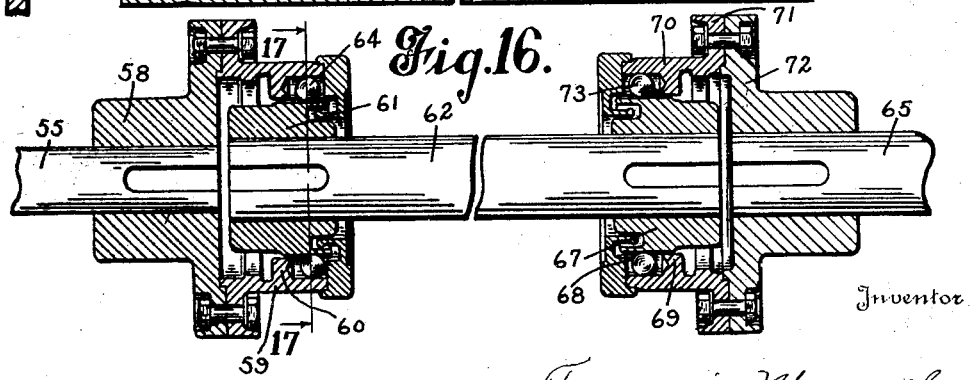
Figure 11:
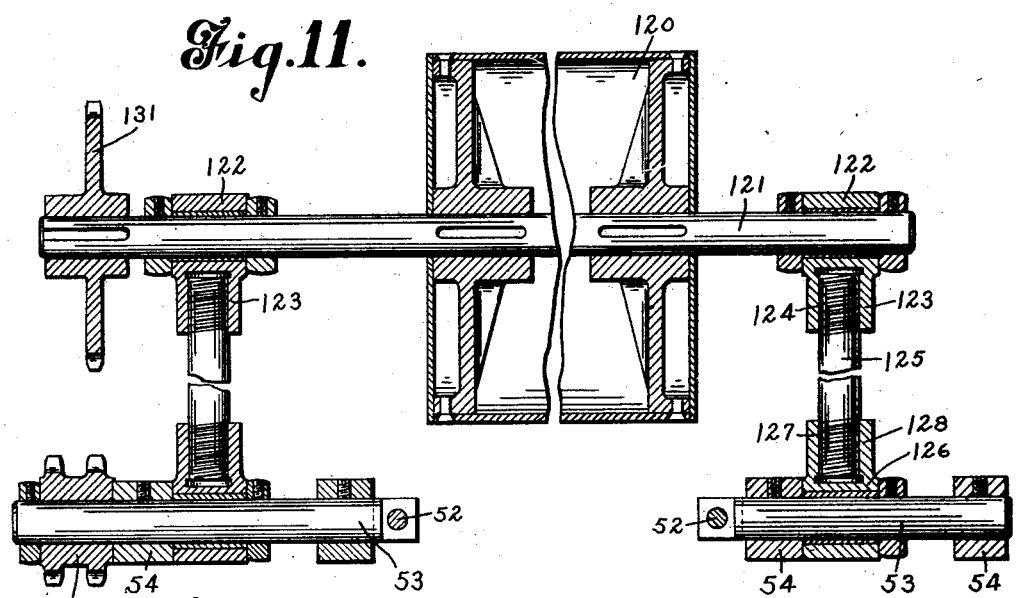
Figure 12:
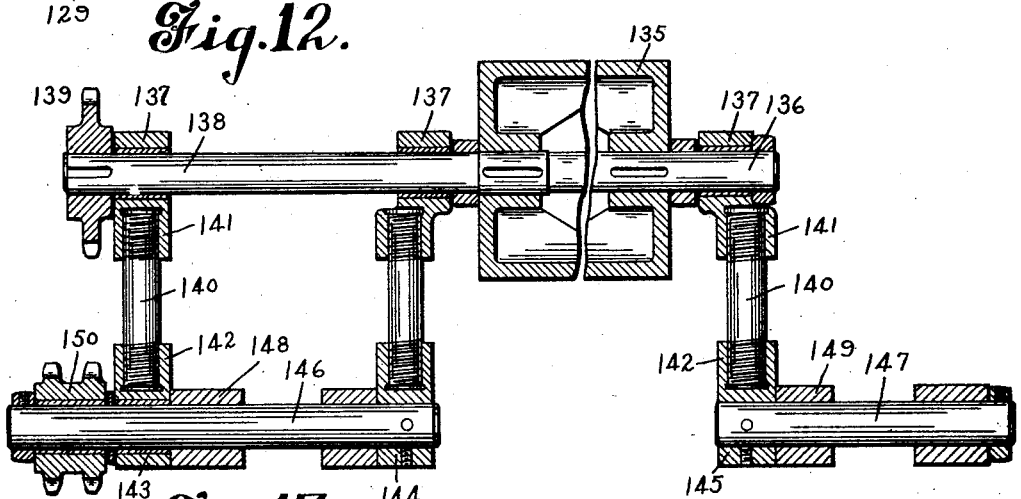
Figure 17:
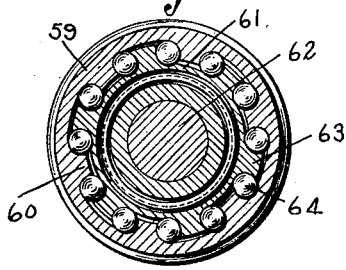
Figure 13:
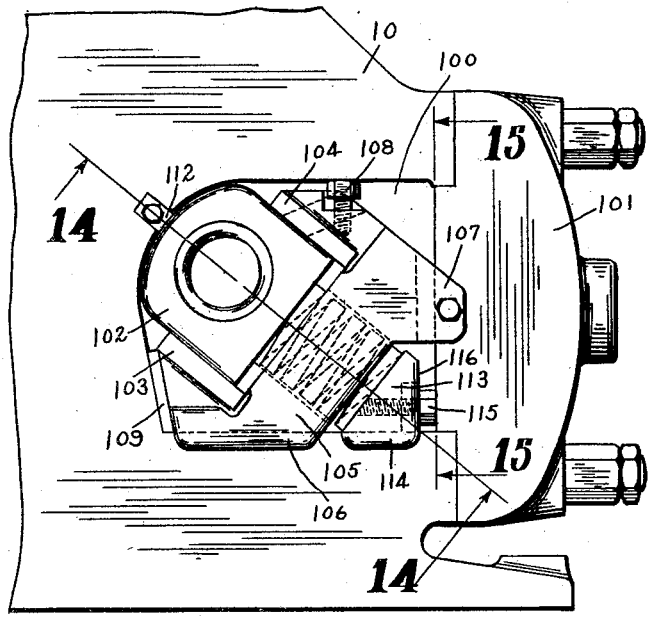
Figure 14:
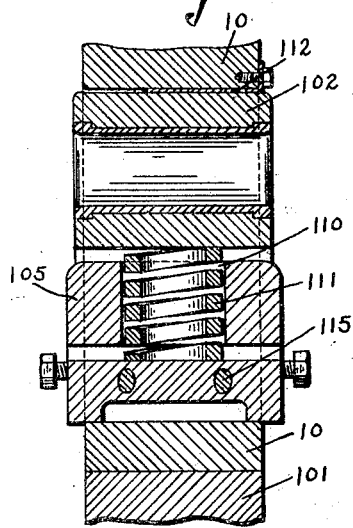
Figure 15:
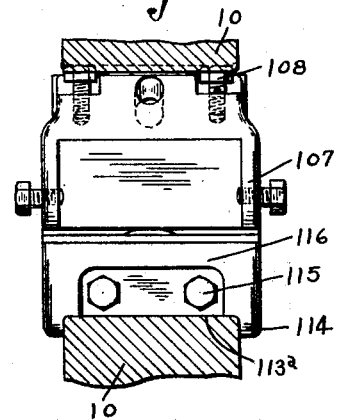

Fig. 3 is a section on line 3—3 of Fig. 1;
Fig. 4 is a section on line 4—4 of Fig. 2;
Fig. 5 is a section on line 5—5 of Fig. 4;
Fig. 6 is a section on line 6—6 of Fig. 4;

Fig. 6^A is a section on line 6^A—6^A of Fig. 6;
Fig. 7 is an enlarged partial section, showing a portion of a crusher roll, the scraper plate therefor, and a portion of the shredding roll;
Fig. 8 is a section on line 8—8 of Fig. 7;
Fig. 9 is a section on line 9—9 of Fig. 7;
Fig. 10 is a section on line 10—10 of Fig. 7;
Fig. 11 is a section on line 11—11 of Fig. 3;
Fig. 12 is a section on line 12—12 of Fig. 3;
Fig. 13 is an end elevation of a somewhat modified form of shredding roll bearing;
Fig. 14 is a section on line 14—14 of Fig. 13;
Fig. 15 is a section on line 15—15 of Fig. 13;
Fig. 16 is a section on line 16—16 of Fig. 2, and
Fig. 17 is a section on line 17—17 of Fig. 16.

The cane crushing and pressing apparatus selected to illustrate the features of this invention, comprises generally, two pairs of similarly formed frame members 10 and 11, one of which supports a pair of toothed cane crushing or pressing rolls 12 and 13, and a cane shredding roll 14, and the other pair of frames supporting a set of juice expressing rolls 15, 16 and 17. The two pairs of frames are interconnected by a chute 18, the bottom of which is formed of a moving belt-like cane carrier 19, by which the cane is fed from one to the other. A cane chute 20 is provided through which the cane is fed toward and into the bite of the rolls 12 and 13. Suitable and similar means (not shown) carries the cane from the rolls 15 and 17, toward subsequent mills when the same are required.

The rolls 12 and 13 are rotatably mounted in the frames 10 and 11 and arranged therein in any of a number of well known ways, whereby pressure may be applied therebetween. Each of the rolls 12 and 13 is provided with peripheral ribs 21 which intermesh with corresponding ribs upon the other roll. A plurality of substantially longitudinally extending grooves 22, intersecting the peripheral ribs 21 and forming teeth 23, which face in the direction of rotation of the respective roll, are provided in each roll. The rolls are mounted upon shafts 24 and 25 respectively, which are geared together by gears 26 and 27, the shaft 24 being extended at one end and coupled to a source of power, such as an engine or electric motor 160, through suitable reduction gearing 161, 162 and 163, whereby the rolls 12 and 13 may be rotated at a comparatively slow rate of speed.

A member 28, commonly termed "a turn plate" is provided and is suitably arranged in cooperation with the bottom roll 13 to both clean the same by means of teeth adapted to enter the spaces between the peripheral ribs 21 thereof, and to provide a cane turning surface 29, which engages the cane passed between the rolls 12 and 13, and guides it upwardly away therefrom. The turn plate 28, in this instance, directs the pressed and crushed cane toward the restricted space between the shredder roll 14 and a member cooperating therewith. As the cane passes between the top roll 12 and the turn plate 28, and preferably while it is held tightly therebetween in a compressed condition, the rapidly revolving shredder roll 14 combs it into fine shreds.

A scraper plate 30 adjustably supported between the frames 10 and 11 is provided. The plate 30 is adapted to engage the roll 12 within the spaces between the peripheral ribs 21 thereof, by means of teeth 31, formed upon one of its edges. The toothed portion 32 of the plate is disposed generally between the periphery of the shredder roll 14 and the periphery of the roll 12, and presents a surface 33 to the teeth 34 of the shredder roll. The surface 33 in this instance, is provided with a plurality of spaced apart ribs 35, formed by grooving the plate upon this surface. The ribs 35 extend transversely of the plate with respect to its length and also to the longitudinal axis of the shredder roll.

The scraper plate 30 is provided with a plate-like extension 36 angularly disposed relatively thereto, and which is adjustably secured to one side of a supporting bar 37, by means of bolts 38 which pass through openings 39 in the bar 37, and through elongated openings 40 in the plate extension 36. A part 41 extending substantially at right angles from the extension 36, is disposed along another side of the bar 37, being bolted thereto by means of an elongated bolt 42. Adjustment of the plate 30 with respect to the peripheries of both the roll 12 and the roll 14 is permitted by this arrangement, so as to insure proper cooperation therebetween.

The bar 37 is provided with a trunnion 43 at each end, which is rotatably supported by a bearing block 44, secured to the frame 10 or 11 adjacent thereto. An arm 45 is secured to each of the trunnions 43 adjacent each of the bearing blocks 44, and extends generally upwardly and outwardly from the adjacent frame 10 or 11. The outer end 46 of the arm 45 is engaged by a coil spring 47 secured on the upper end of a rod 48, pivoted at its lower end to the adjacent frame 10 or 11, as at 49. The spring 47 acts upon the arm 45 to retain the scraper plate 30 resiliently in close scraping engagement with the roll 12. Nuts 50 threadingly engaging the upper end of the rod 48, permit regulation of the tension of the spring 47. A lug 51 is provided upon each arm 45 and is so disposed thereon that it is engageable by an end of an adjustable stop screw 52. The screw 52 is threaded through an end of a stud shaft 53, rigidly mounted in a bracket 54, secured upon the adjacent frames 10 or 11. The stop screw 52 prevents the scraper plate 30 moving away from the roll 12 to such an extent that the teeth 34 of the shredding roll 14 will strike or engage the same during the operation thereof.

The ends 55 of the shredding roll shaft 56 are journalled in bearings disposed in an opening 57 provided in each of the frames 10 and 11, the opening 57, in this instance, being one previously provided and adapted to receive the bearing of a roll previously arranged to cooperate with rolls 12 and 13 to form a three roll mill. One of the shaft ends 55 extends beyond the bearing at one side of the unit and is secured to a flange coupling part 58. The flange coupling part 58 is secured to the flange portion of a sleeve 59, which is provided with a plurality of depending lugs 60 upon the interior periphery thereof. A coupling member 61 secured upon the end of an extension shaft 62 is provided with lugs 63 upon its periphery, which intermesh with the lugs 60 of the sleeve 59. Rotatable members 64 are disposed between the opposing side surfaces of the lugs 60 and 63 in suitable races formed therein, and form interdriving means between the shaft 62 and the shaft end 55. This arrangement permits angular misalignment of one shaft with respect to the other.

A similar arrangement is provided between the other end of the shaft 62 and shaft 65 of an electric motor 66, there being a hub member 67 secured to shaft 62 which has lugs 68 upon its periphery that are disposed between lugs 69 formed upon the interior periphery of a sleeve member 70. The sleeve 70 is provided with a flange 71, which is bolted to a flange coupling part 72, secured to the motor shaft 65. Rotatable members 73 are interposed between the lugs 68 and 69 to form interdriving means therebetween. Angular misalignment between shafts 62 and 65 is permitted by this coupling arrangement, and both angular misalignment and parallel misalignment is permitted between the motor shaft 65 and the roll shaft 56, whereby substantially all vibration is prevented and strains due therefrom are not present when the roll 14 is in operation. The motor 66 is adapted to drive the roll 14 at a comparatively high rate of speed and, therefore, smoothness of operation is especially essential.

Each of the shredding roll shaft bearings comprises a block 74 provided with a cap 75. The block 74 is provided with a pair of guiding tongues 76, which straddle respectively a part of the adjacent frame 10 or 11 and a part of a cap piece 77, extending across the opening 57 and bolted to the adjacent frame. The blocks 74, by this arrangement, are slidable with respect to the frame upon which each is mounted, the arrangement being such as to permit movement of the bearing with the roll shaft 56 and roll 14 toward and away from the cooperating surface 33 of the scraper plate 30, and toward and away from the upper roll 12. The direction of movement of the roll 14, due to the cooperation of the movable bearing block 74 with the adjacent frame 10 or 11, is substantially along the line at right angles to the surface 33.

The bearing block 74 is provided with a pair of recesses 78 directed generally downwardly and parallel with the guides 76. A coil spring 79 is inserted in each of the recesses 78 in engagement with the block 74 at one end, and extends downwardly beyond the same into engagement with a surface 81 of a wedge member 80 at the other end. The surface 81 is substantially in a plane at right angles to the direction of movement of the block 74 and parallel with the surface 33 of the scraper bar 30. The base 82 of the wedge 80 is provided with a pair of ears 83, one disposed on either side of the adjacent frame 10 or 11, to guide the wedge in its movements thereon. The wedge 80 is connected to the block 74 by means of stud bolts 84, one at either end thereof. The bolts 84 at one end thereof are threaded into the block 74. At the other end, these bolts pass through elongated openings 85 provided in the wedge 80, and are engaged by a nut 86. A sheet of steel or other hardened material 87 is disposed between the ends of the springs 79 and the wedge 80, to prevent undue wear thereon. The upright surface 88 of the wedge 80 is disposed in position to be engaged by an end of an adjusting screw 89, which is threaded through the cap piece 77. A detachable boss 90 is secured upon the internal surface of the opening 57, and is disposed thereon in position to be engaged by the bearing cap 75 to limit the movement of the shredding roll bearing toward the scraper plate 30 or roll 12.

In the form of bearing above described, the block 74 with its cap 75, springs 79, and wedge 80, may be assembled as a unit before being placed into the opening 57 of the frame. By means of the bolts 84, the tension on the spring 79 may be adjusted before inserting this bearing unit in place. The wedge 80, after the unit is in place within the opening 57 and the cap piece 77 bolted to the frame, may be moved inwardly to increase the tension of spring 79, or released outwardly thereby to decrease the same by means of the adjusting screw 89.

In the form of bearings shown in Figs. 13, 14 and 15, the opening 100 in the frames 10 and 11, is provided with a cap piece 101. A bearing block 102 is provided for the shredding roll shaft. The block 102 is slidable in the opening 100 to carry the shredding roll toward and away from the cooperating scraper plate, as in the form described above. The block 102 is slidably mounted between guideways 103 and 104 formed in a bearing block supporting bracket 105. The bracket 105 is provided with a pair of downwardly directed guide ears 106, one of which is disposed on either side of the adjacent frame 10 or 11, and depends along this side to guide the bracket and retain it against lateral movement with respect to the frame. The bracket 105 rests on the interior surface of the lower wall of the opening 100. At another point the bracket 105 is provided with a pair of lugs 107, that straddle the cap piece 101 and are bolted thereto. A screw 108 projects upwardly from the bracket 105 and engages the upper wall of the opening 100. A spacing block 109 is disposed between the bracket 105 and the rear wall of the opening 100. An opening 110 is provided in the bracket 105, which permits the free passage therethrough of a coiled spring 111. A limiting stop member 112 is disposed and secured to the interior wall of the opening 100 in proper position to engage the block 102 and prevent its inward movement beyond a predetermined amount.

The spring 111 passing through the opening 110, engages the block 102 at one end and abuts or rests upon a wedge member 113 at the other end. The base 113$^a$ of the wedge member is provided with a pair of depending ears 114, which straddle the frame member to prevent lateral displacement thereof with respect to the frame. The ears 114 act as guides for the member 113, which is slidably mounted upon the lower wall of the opening 100. Adjusting screws 115 threaded into the upright surface 116 of the wedge, engage against the cap piece 101. By manipulation of the screws 115, the wedge 113 may be moved inwardly or released outwardly to vary the tension on the spring 111.

Sugar cane or the like is passed between the rolls 12 and 13, turned by the turn-plate 28, and directed into the restricted space between the scraper plate 30 and the shredding roll 14, and while in compressed condition and under a restraining action due to being held between the roll 13 and plate 28, it is substantially thoroughly shredded and disintegrated. The shredded cane emerges from between the roll 14 and plate 30 in a comparatively fluffy mass of finely divided fibres intermixed with cane juice. This mass expands and requires considerable space.

Because of the nature of this mass, it is difficult for a subsequent set of rolls, such as rolls 15, 16 and 17, to engage a sufficient quantity thereof and to pass it therethrough while pressing it as rapidly as it is being shredded by the shredding roll. It is advisable, therefore, to provide means to compress or mat this mass into a more or less dense blanket of uniform thickness throughout, which will be readily received in the bite of the rolls 15 and 16.

For the above purposes, a roller 120 of such structure as to be of sufficient weight, is provided. The roller 120 is mounted upon a shaft 121, which is journaled in a bearing member 122 at each end thereof. The bearing members 122 are each provided with an outwardly extending lug 123, which is provided with a threaded opening 124. A rod or pipe 125 threaded at each end is engaged in the opening 124 of each member 122 by cooperation of the threads of each. The other end of the part 125 threadingly engages a member 126, within a threaded opening 127, in a lug portion 128 thereof. A member 126 is mounted upon each of the stud shafts 53, supported in each of the brackets 54. One of the stud shafts 53 has a sprocket 129 rotatably mounted thereon, which is drivingly connected by means of a chain 130 with a sprocket 131 secured to shaft 121. The sprocket 129 is also drivingly connected to a sprocket 132, secured in this instance upon the end of shaft 24 of roll 12. The weight of the roller 120 is sufficient to press the shredded cane into a more or less dense and uniform mat or blanket. Being power driven at a comparatively slow rate of speed, but slightly faster than the rolls 12 and 13, the roller 120 will, while pressing the cane, tend to feed it away from the shredder roll 14, thereby assisting the carrier means 19 to feed the cane toward the rolls 15 and 16.

Another pressing or feeding roller 135 is provided disposed adjacent the rolls 15 and 16. The roller 135 is secured to a shaft 136, which is rotatably mounted in bearing members 137, one at either end of the roller and one at an extending end 138 of this shaft. A sprocket wheel 139 is secured to the outer end of the shaft portion 138. Rods or pipes 140 are threadingly engaged at one end of each in lugs 141, formed upon the bearing members 137. The other ends of the pipes or rods 140 are similarly engaged in lugs 142 formed on sleeve members 143, 144 and 145. The sleeve members 144 and 145 are each secured to the end of a stud shaft 146 and 147 respectively, which are rotatably mounted in brackets 148 and 149 respectively. The brackets 148 and 149 are respectively mounted upon frames 10 and 11. The sleeve member 143 is loosely mounted upon the shaft 146. A sprocket wheel 150 is rotatably mounted upon the shaft 146. A sprocket wheel 150 is rotatably mounted upon the shaft 146 and is drivingly connected to the sprocket wheel 139 by a chain 151. The sprocket 150 is also drivingly connected to a sprocket 152 by a chain 153. The sprocket wheel 152 is secured to the shaft of the roll 15 and obtains power and movement therefrom. The roller 135 while pressing the cane mat or blanket to further condense the same, also acts in cooperation with the carrier 19 to force the shredded cane between the bite of the rolls 15 and 16. Due to the fact, that this roller is rotating slightly faster than the rolls 15 and 16, a crowding effect is produced between it and them, whereby the mat or blanket of cane is slightly increased in thickness at this point. This action insures that the rolls 15 and 16 receive their capacity amount of cane so that the delivery of cane from the shredding roll will not be in excess of that received and pressed by the rolls 15, 16 and 17. In this manner, a continuous and uniform flow of cane will at all times be moving through the cane crushing or pressing apparatus.

The arrangement whereby the rollers 120 and 135 are swingably mounted upon the stud shafts 53 on the one end, and 146 and 147 on the other, and with respect to the carrier 19, permits them to freely ride upon the top of the moving mass of cane thereon. This freedom of movement permits the rollers 120 and 135 to slightly rock or swing upwardly when a somewhat larger quantity of cane is passing, and due to the pressure thereon to evenly distribute it across the carrier 19. This insures that the cane entering the bite of the rolls 15 and 16 will be in the form of a blanket or mat of uniform thickness, across the face of the same. By this arrangement, any unevenness or thickness will be ironed out when they occur intermediate the ends of either roll 120 or 135 while passing beneath the same.

The operation of the apparatus above described is generally as follows, the detail operation of the various mechanisms having been described above in connection with the structural description thereof. Sugar cane or the like, which has preferably been subjected to a preliminary crushing operation in suitable preliminary crushing rolls (not shown), is directed down chute 20 to the rolls 12 and 13, between which it passes and is crushed, pressed and partially disintegrated. The crushed cane is turned by the turn plate 28 and directed toward the shredding roll 14 and the scraper plate 30, passing between the grooved surface 33 and the teeth 34 of the plate and roll respectively. At this point in its travel the cane is attacked by the teeth of the roll 14 which thoroughly shreds and further disintegrates the cane and thereby opens up substantially all of the sugar juice cells. Preferably this action takes place while the cane is still held between the roll 13 and the plate 28. The shredded cane is then fed to the first set of juice expressing rolls 15, 16 and 17 after being compressed into a mat or blanket of uniform thickness in turn by the rollers 120 and 135, and forced into the bite of the rolls 15 and 16 by the cooperating action between the roller 135 and the carrier 19. The rolls 15, 16 and 17 are preferably provided with fairly fine annular ribs as usual in sugar mill practice. The cane passing through the 3-roller mill consisting of the rolls 15, 16 and 17, is pressed under heavy pressure for the extraction of juice, after which it is usually fed to a plurality of subsequent successive sets of juice expressing rolls (not shown) in which the compression and juice extraction are continued.

The combined effect of rolls 12 and 13 and the shredding roll and grooved scraper plate 14 and 30 respectively, is such that the cane is thoroughly and effectively disintegrated and after leaving the shredder is in the best possible condition for the extraction of juice by the following sets of rolls of the tandem. Thus, a given number of pressing rollers can, where the shredding device is used, do more effective juice expressing than a tandem of the same or approximately the same number of rolls in connection with which a shredder is not employed. The rollers 120 and 135 acting in cooperation with rolls 15, 16 and 17 provide a uniform and evenly distributed mat or blanket of cane for subsequent juice expressing operations.

Preferably, the speed of rotation of the rolls 12 and 13 is from 2 to 4 R. P. M. whereby a surface speed of from substantially 18 to 36 feet per minute is obtained. The shredder roll 14 is preferably given a speed of from 200 to 500 R. P. M., whereby a surface speed of from substantially 1500 to 3200 feet per minute is obtained.

While I have shown and described a preferred embodiment of my invention, it is to be understood that the same is not limited thereto in all of the details shown, as many modifications and variations thereof are possible, which will lie within the spirit of the invention and the scope of the appended claims.

What I claim is:

1. A scraper plate for cane crushing apparatus having a pressure roll and a shredding roll, said plate having teeth along an edge thereof, said teeth being adapted to enter grooves in the pressure roll disposed at one side of said plate, and a plurality of ribs upon the side of said plate opposite the pressure roll, said ribs being adapted to coact with the shredding roll to shred cane passed therebetween, said ribs being radially beyond the periphery of said shredding roll.

2. A scraper plate for cane crushing apparatus having a pressure roll and a shredding roll, said plate having a plurality of transversely extending ribs upon the side of said plate opposite the pressure roll, said ribs being adapted to act with the shredding roll to shred cane passing therebetween, said ribs being radially beyond the periphery of said shredding roll.

In witness whereof, I have hereunto set my hand this 20th day of May, 1927.

FRANCIS MAXWELL.